US010288268B2

(12) United States Patent
Spintge et al.

(10) Patent No.: US 10,288,268 B2
(45) Date of Patent: May 14, 2019

(54) OLED ILLUMINANT FOR A LAMP

(75) Inventors: Ulrich Spintge, Sprockhoevel (DE);
Karsten Diekmann, Rattenberg (DE);
Britta Goeoetz, Regensburg (DE);
Steven Rossbach, Adorf (DE); **Tom
Munters, Hasselt Alken (DE); Vincent
Johannes Jacobus Van Montfort**,
Sittard (NL)

(73) Assignees: Panasonic Corporation, Osaka-Fu
(JP); OSRAM OLED GmbH,
Regensburg (DE); **OLEDWorks
GmbH**, Aachen (DE)

( * ) Notice: Subject to any disclaimer, the term of this patent is extended or adjusted under 35 U.S.C. 154(b) by 677 days.

(21) Appl. No.: 13/880,156

(22) PCT Filed: Oct. 18, 2011

(86) PCT No.: PCT/EP2011/068193
§ 371 (c)(1),
(2), (4) Date: Dec. 19, 2013

(87) PCT Pub. No.: WO2012/052440
PCT Pub. Date: Apr. 26, 2012

(65) Prior Publication Data
US 2014/0104857 A1    Apr. 17, 2014

(30) Foreign Application Priority Data
Oct. 18, 2010    (DE) .................. 10 2010 038 251

(51) Int. Cl.
*F21V 21/002*    (2006.01)
*F21K 9/00*    (2016.01)
(Continued)

(52) U.S. Cl.
CPC .............. *F21V 21/002* (2013.01); *F21K 9/00*
(2013.01); *F21S 2/005* (2013.01); *F21V 21/02*
(2013.01);
(Continued)

(58) Field of Classification Search
CPC . F21K 9/00; F21K 9/10; F21K 9/1355; F21K
9/30; F21S 2/005; F21S 2/00;
(Continued)

(56) References Cited

U.S. PATENT DOCUMENTS 3,056,897 A * 10/1962 Knochel ................ H05B 33/06
313/324
6,184,628 B1    2/2001 Ruthenberg
(Continued)

FOREIGN PATENT DOCUMENTS

DE    102006015437 A1    10/2007
DE    102007041136 A1    3/2009
(Continued)

OTHER PUBLICATIONS

International Search Report, International Application No. PCT/EP2011/068193, dated Jan. 10, 2012, 12 pages.
(Continued)

*Primary Examiner* — Sean P Gramling
*Assistant Examiner* — Omar Rojas Cadima
(74) *Attorney, Agent, or Firm* — Fitch, Even, Tabin & Flannery LLP

(57) ABSTRACT

The invention relates to an illuminant (23) and a socket (20) for a lamp (15). The features of the socket (20) can be implemented also independently of the features of the illuminant (23). The illuminant (23) has a preferably planar illumination surface (24). One or more semiconductor lighting elements are arranged within an illuminant housing (30). The illuminant connection device (70) required for mechani-
(Continued)

cal and electrical connection to the socket (20) is provided on the rear face (66) of the illuminant (23), said rear face (66) lying opposite the illumination surface (24). The dimensions of the illuminant are preferably greater than the dimensions of the socket (10) such that the illuminant (23) fully covers the socket when looking onto the illumination surface (24), resulting in a particularly appealing look. Said socket and illuminant (23) modularly achieve large total illumination surfaces in a lamp (15) and an appealing overall appearance in a very simple manner.

18 Claims, 11 Drawing Sheets

(51) Int. Cl.
| | | |
|---|---|---|
| *F21S 2/00* | (2016.01) | |
| *F21V 21/02* | (2006.01) | |
| *F21V 23/06* | (2006.01) | |
| *B60Q 1/00* | (2006.01) | |
| *F21S 8/00* | (2006.01) | |
| *F21S 8/04* | (2006.01) | |
| *F21Y 105/00* | (2016.01) | |
| *F21Y 115/15* | (2016.01) | |
| *F21Y 115/10* | (2016.01) | |

(52) U.S. Cl.
CPC .......... *F21V 23/06* (2013.01); *F21S 8/033* (2013.01); *F21S 8/04* (2013.01); *F21Y 2105/00* (2013.01); *F21Y 2115/10* (2016.08); *F21Y 2115/15* (2016.08); *Y02B 20/36* (2013.01)

(58) Field of Classification Search
CPC ...... F21S 8/04; F21S 8/033; F21S 8/03; F21S 8/035; F21S 8/02; F21V 21/02; F21V 21/002; F21V 21/04; F21V 21/34; F21V 19/00; F21V 19/0005; F21V 19/001; F21V 23/06; F21V 15/01; F21Y 2105/008; F21Y 2101/02; Y02B 20/36; G09F 13/222; G09F 13/14; H01H 23/025; E04B 5/46; H01L 23/32; H01L 23/58; H01L 51/50; H01R 33/94; H01R 33/945
USPC ........ 313/512, 500, 504; 362/240, 800, 230, 362/246, 247; 257/100
See application file for complete search history.

(56) References Cited

U.S. PATENT DOCUMENTS

| | | | | |
|---|---|---|---|---|
| 6,250,773 | B1* | 6/2001 | Lai | F21S 8/035 |
| | | | | 362/253 |
| 6,565,231 | B1* | 5/2003 | Cok | F21S 6/002 |
| | | | | 313/504 |
| 6,787,990 | B2 | 9/2004 | Cok | |
| 7,108,392 | B2 | 9/2006 | Strip | |
| 7,201,511 | B2* | 4/2007 | Moriyama | F21K 9/00 |
| | | | | 257/668 |
| 7,549,786 | B2* | 6/2009 | Higley | F21L 4/027 |
| | | | | 362/640 |
| 7,553,162 | B2* | 6/2009 | Isoda | F21K 9/00 |
| | | | | 362/249.01 |
| 2003/0031032 | A1 | 2/2003 | Wu | |
| 2003/0222558 | A1 | 12/2003 | Cok | |
| 2005/0148241 | A1 | 7/2005 | Kohen | |
| 2005/0239342 | A1 | 10/2005 | Moriyama et al. | |
| 2006/0082315 | A1* | 4/2006 | Chan | F21K 9/00 |
| | | | | 315/46 |
| 2008/0130275 | A1 | 6/2008 | Higley et al. | |
| 2008/0266206 | A1* | 10/2008 | Nelson | G09F 9/33 |
| | | | | 345/1.3 |
| 2008/0297072 | A1 | 12/2008 | Snijder et al. | |
| 2010/0072921 | A1* | 3/2010 | Weatherley | F21K 9/00 |
| | | | | 315/297 |
| 2011/0013390 | A1 | 1/2011 | Biebel et al. | |
| 2011/0186880 | A1 | 8/2011 | Koehler et al. | |
| 2011/0318954 | A1 | 12/2011 | Lin | |
| 2012/0194970 | A1 | 8/2012 | Verjans et al. | |

FOREIGN PATENT DOCUMENTS

| | | |
|---|---|---|
| FR | 2623028 A1 | 5/1989 |
| GB | 224553 A | 4/1926 |
| JP | S55140202 U | 10/1980 |
| JP | 2003059331 A | 2/2003 |
| JP | 2003068129 A | 3/2003 |
| JP | 2004127910 A | 4/2004 |
| JP | 2007139016 A | 6/2007 |
| JP | 2007250303 A | 9/2007 |
| JP | 2007273205 A | 10/2007 |
| JP | 2009519577 A | 5/2009 |
| JP | 2009531569 A | 9/2009 |
| JP | 2010514113 A | 4/2010 |
| JP | 2010135250 A | 6/2010 |
| WO | 2009072386 A1 | 6/2009 |
| WO | 2010101405 A2 | 9/2010 |
| WO | 2012052440 A2 | 4/2012 |

OTHER PUBLICATIONS

Office communication in corresponding European application No. 11773243.8, dated Jan. 30, 2015, 5 pages.
Notification of Reasons for Refusal in corresponding Japanese application No. 2013-534298, dated Jan. 6, 2015.
International Search Report in International Application No. PCT/EP2011/068194, dated Jan. 10, 2012, 12 pages.
Office communication in European application No. 11771136.6, dated Jan. 30, 2015, 8 pages.
Japanese Search Report in Japanese application No. 2013-534297, dated Dec. 24, 2014, 26 pages.
Notification of Reasons for Refusal in Japanese application No. 2013-534297, dated Jan. 23, 2015, 9 pages.
Notification of Reasons for Refusal in Japanese application No. 2013-534297, dated Oct. 25, 2015, 8 pages.
First Office Action in Chinese application No. 201180060760.6, dated Aug. 17, 2015, 22 pages.
Second Office Action in Chinese application No. 201180060760.6, dated Jan. 31, 2016, 8 pages.
Office Action in U.S. Appl. No. 13/880,228, dated Dec. 15, 2015, 13 pages.
Office Action in European application No. 11771136.6, dated Apr. 13, 2016, 6 pages.
Korean Notice of Final Rejection dated Jun. 29, 2018 for corresponding Korean Application No. 10-2013-7012677, with English Translation (5 pgs.).

\* cited by examiner

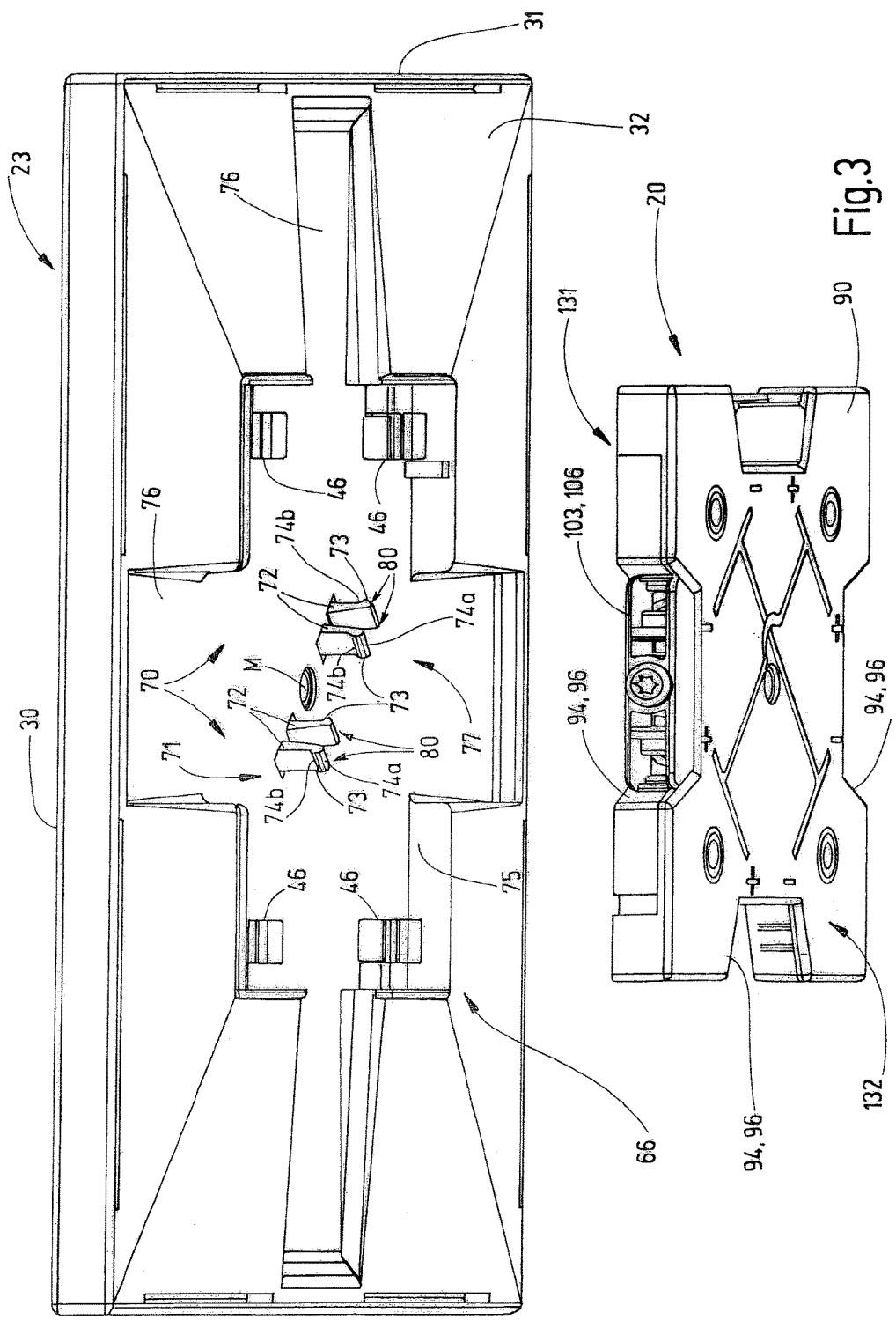

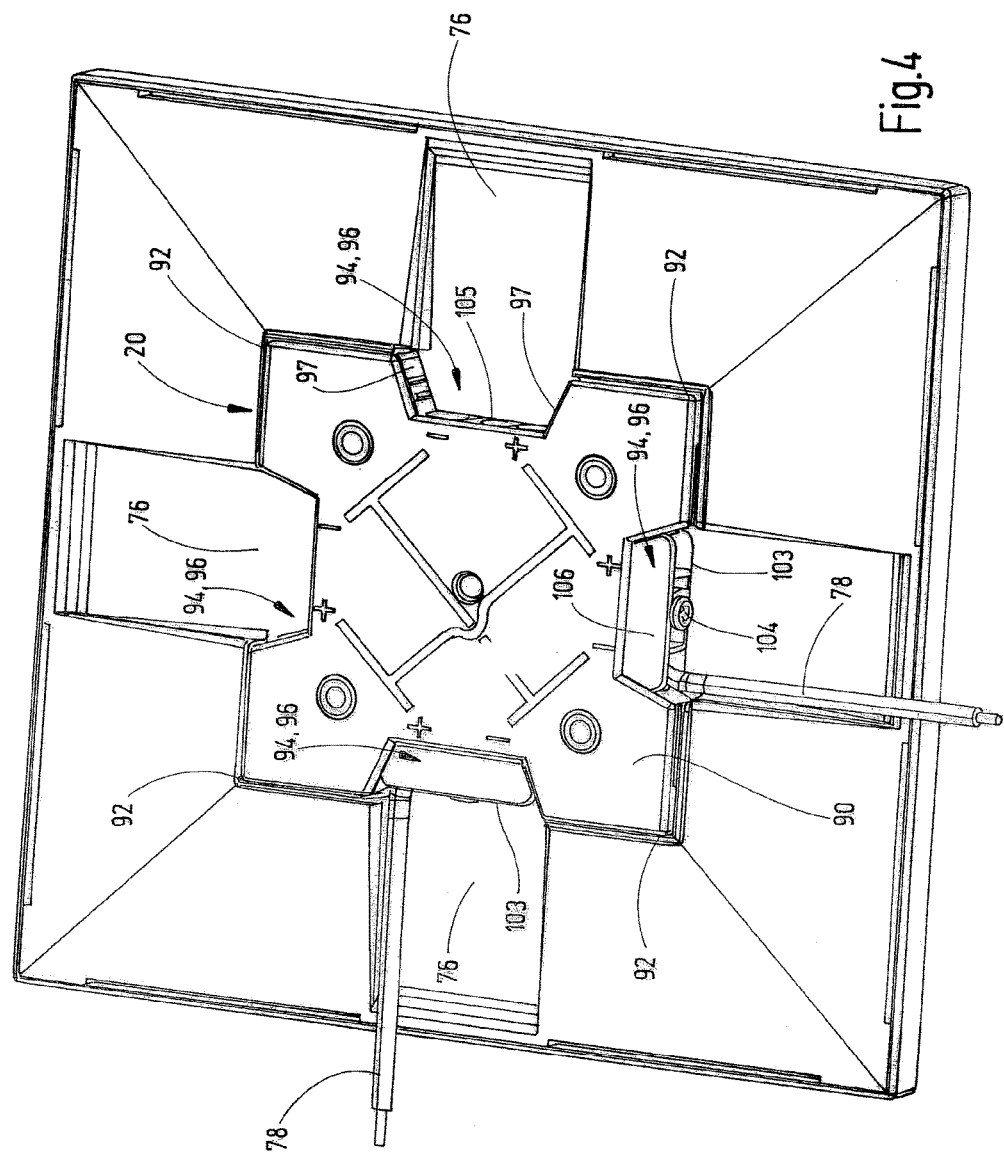

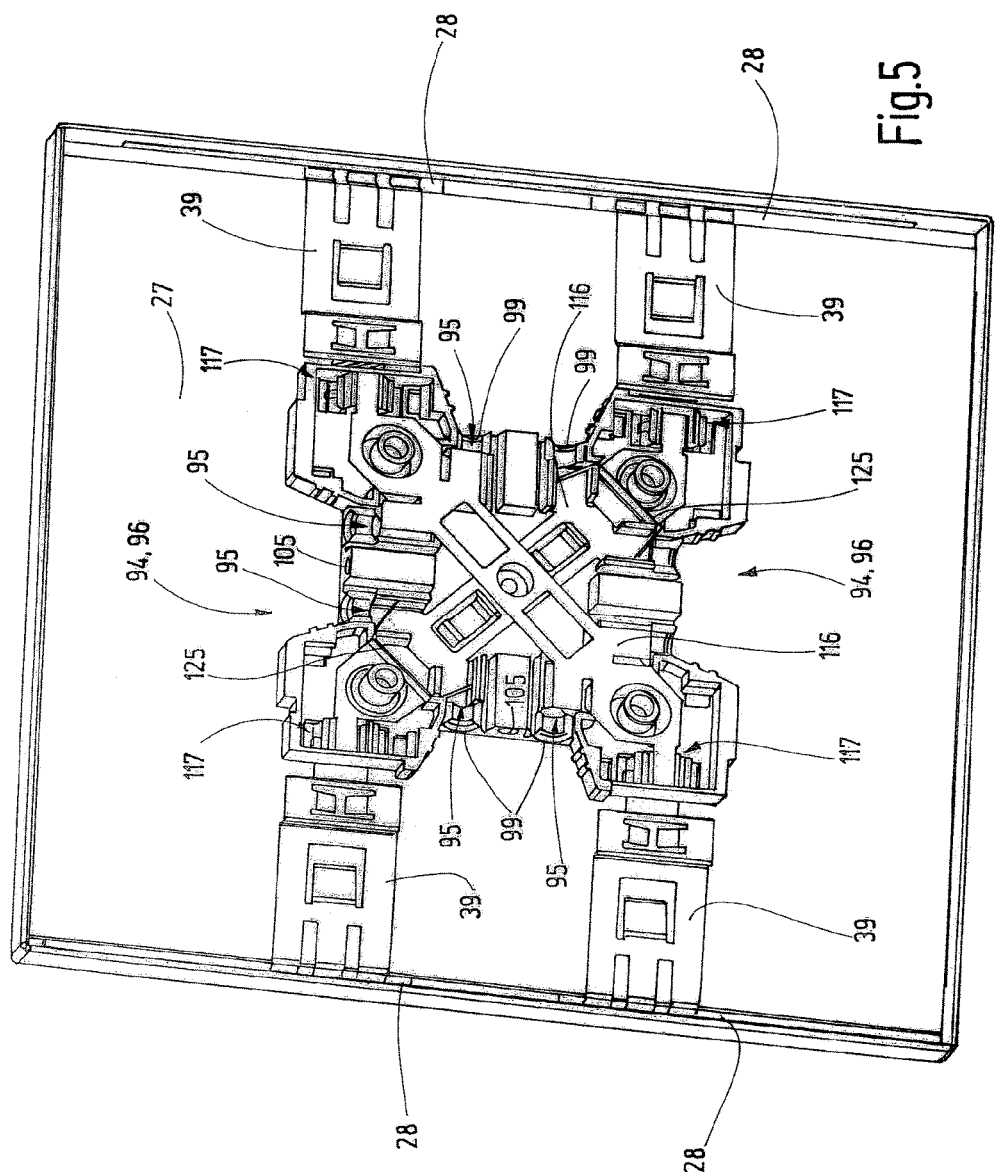

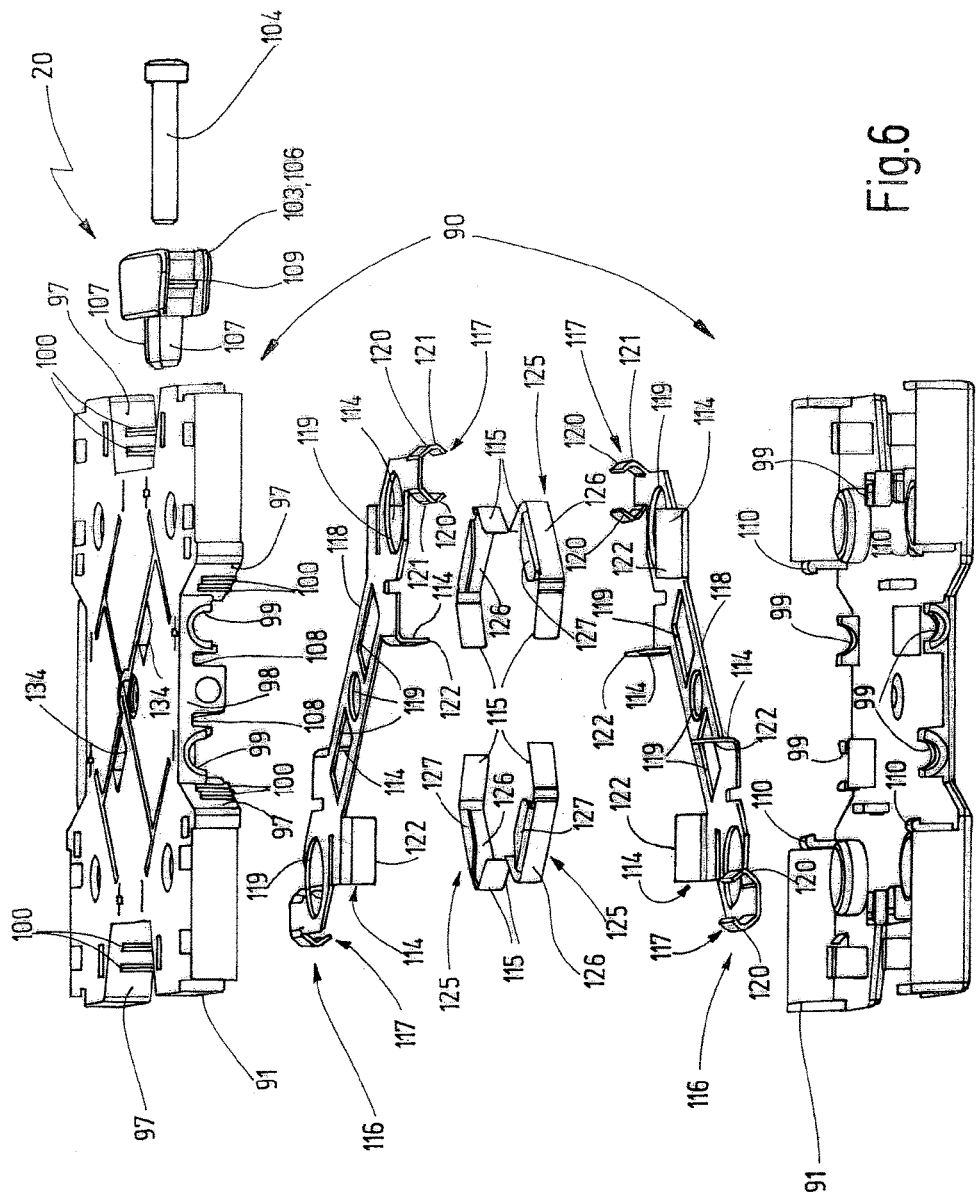

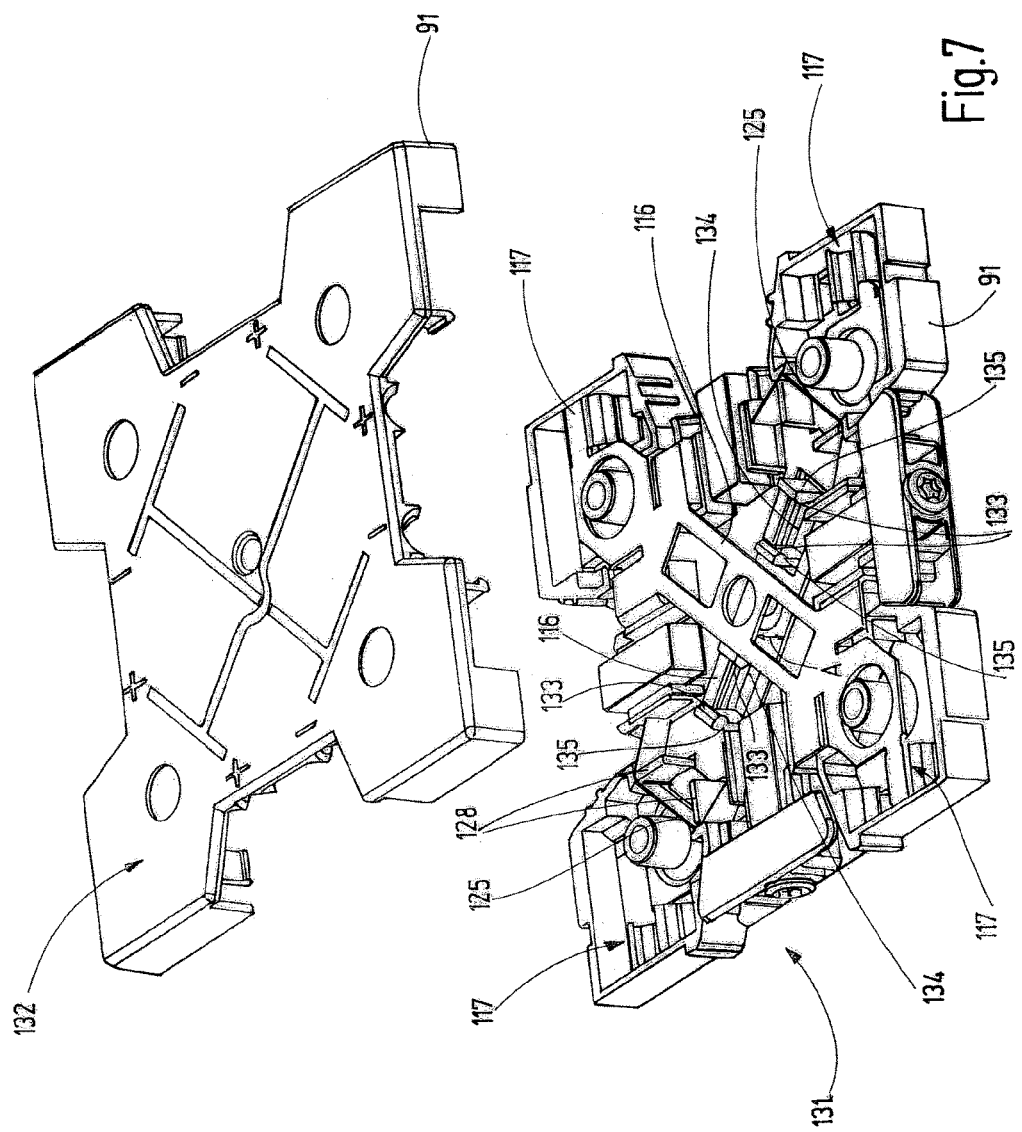

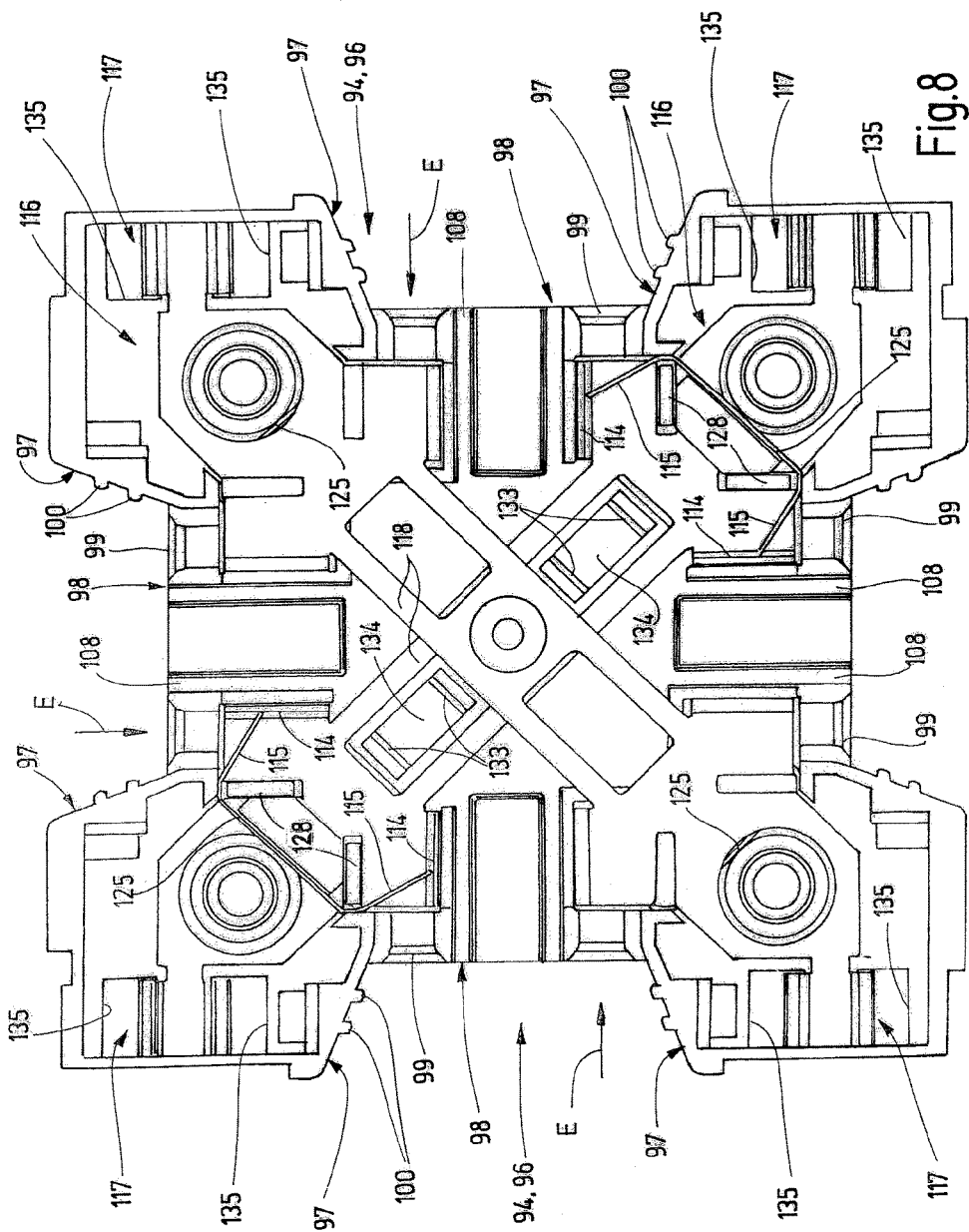

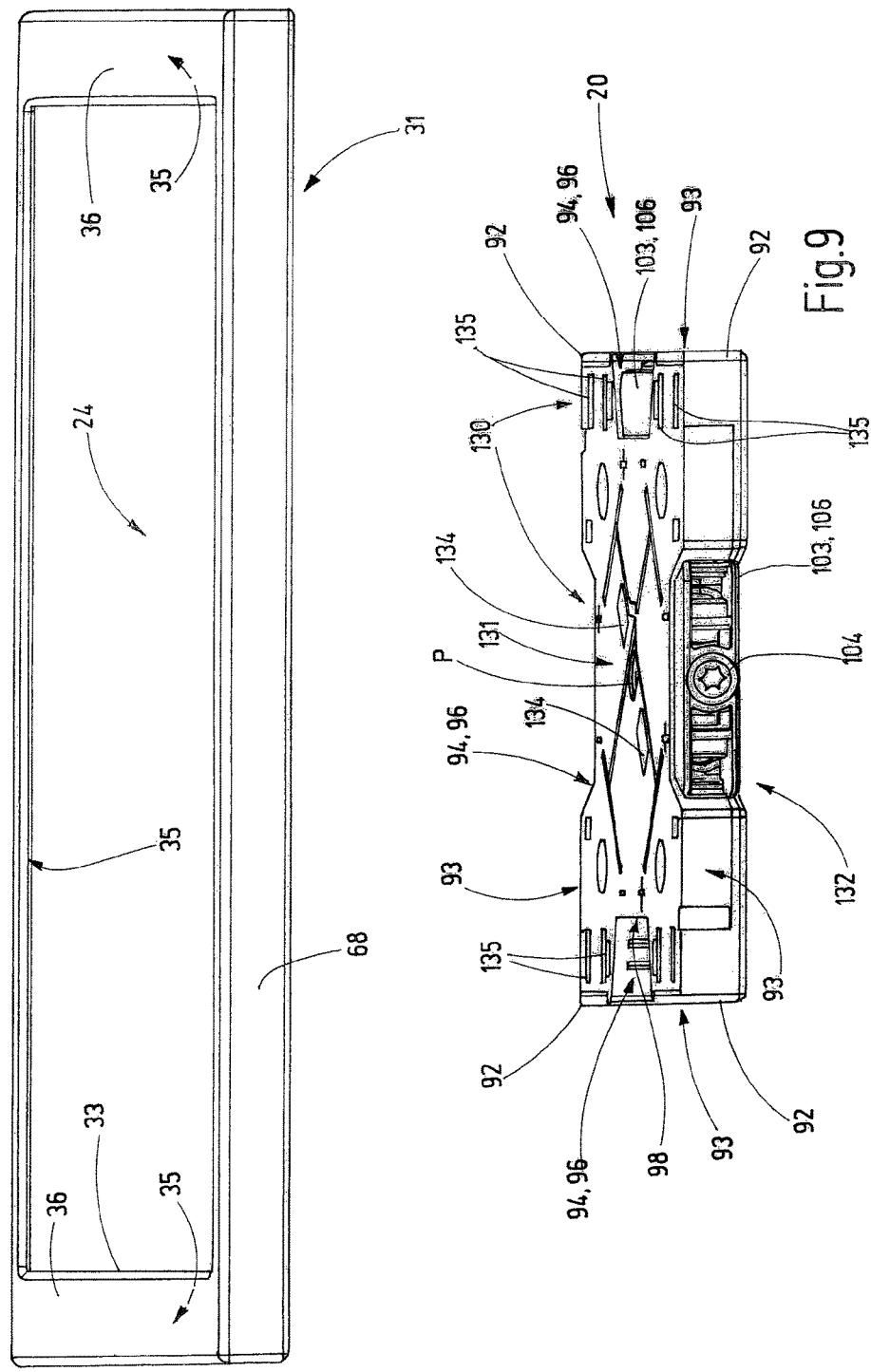

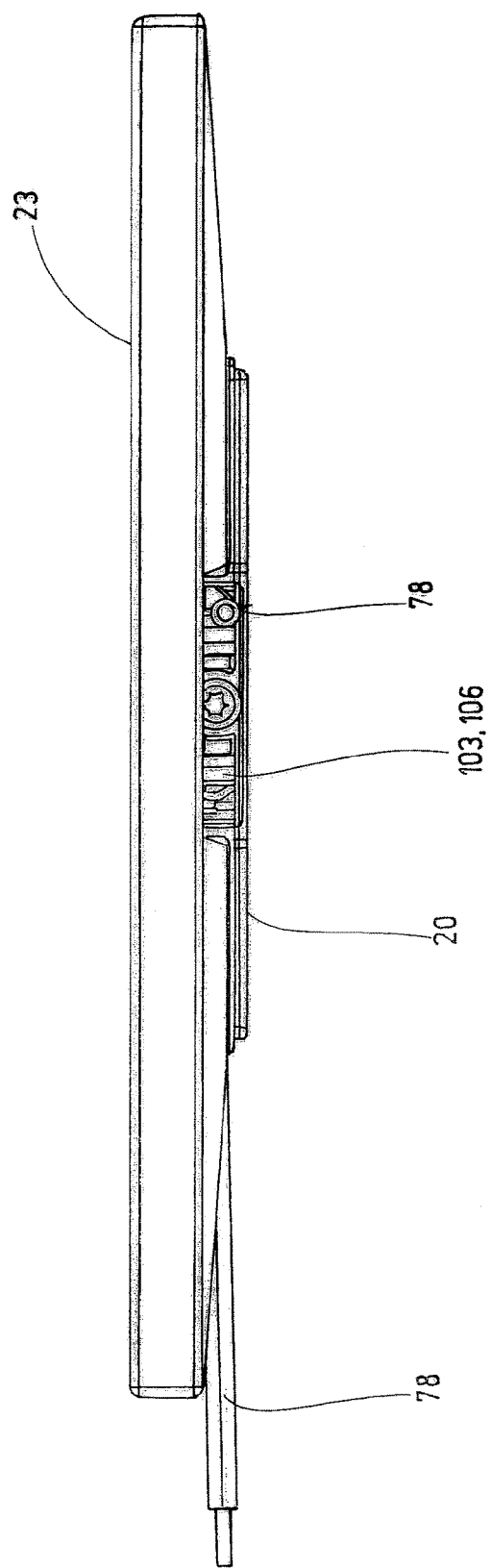

OLED ILLUMINANT FOR A LAMP

CROSS REFERENCE TO RELATED APPLICATIONS

This patent application is the national phase of PCT/EP2011/068193 filed Oct. 18, 2011, which claims the benefit of German Patent Application No. DE 102010038251.5 filed Oct. 18, 2010, the contents of each which are incorporated herein by reference in their entireties.

TECHNICAL FIELD

The invention relates to a lamp comprising a semiconductor lighting element, for example a light-emitting diode (LED) and, in particular, an organic light-emitting diode (OLED). The illuminant is designed as a planar illuminant. The demand for planar lamps is increasing. For example, such planar lamps are mounted to walls or ceilings for illumination and are of interest both because of their illuminating characteristics and their visually pleasing overall appearance and because of their low energy consumption.

BACKGROUND

Lamps comprising OLED illuminants and a socket have been known from prior art. For example, publication DE 603 06 720 T2 discloses an organic light-emitting diode layer located on a substrate. The substrate is designed as a plate and comprises a tab with electrical strip conductors on a narrow side. With the aid of this tab, the substrate can be inserted into a corresponding insertion opening of a socket and it is in contact with the strip conductors. Considering this, a planar installation on a wall or ceiling with adjacently arranged illumination surfaces is difficult. It has also been found that an exact alignment of the substrates on a common plane next to each other cannot be accomplished with the desired accuracy in such a connection between socket and illuminant.

Publication DE 603 06 721 T2 discloses additional connecting possibilities between illuminant and socket. For example, bracket-shaped sockets can be used, said sockets enclosing the substrate on two opposing sites. The electrical contact between the bracket-shaped socket and the illuminant is accomplished via conductors provided on one flat side of the substrate or via two substrate tabs provided on two opposing narrow sides, each substrate tab being provided with the respective electrical conductors. Such a lamp does not meet all of the requirements regarding their mountability or the desired visually appealing effect. The bracket-shaped socket has the disadvantage that the illuminant must be inserted into the socket from one side. Considering this arrangement of several illuminants in rows and/or columns, the replacement of at least the center illuminant is laborious and time-consuming.

Another LED lamp has been known from publication DE 10 2008 024 776 A1. A light-emitting diode is plugged into a housing and enclosed by a reflector that is also connected with the housing. For electrical contact, magnetic contacts that can be placed on magnetic contact surfaces are provided. The supply voltage is applied to the magnetic contact surfaces. In order to avoid a voltage reversal the magnetic polarity of the contact surfaces and the contact feet of the LED lamp are selected in such a manner that matching electrical contacts are magnetically attracted, whereas non-matching electrical contacts are magnetically repelled. A protection against accidental contact is not provided for the electrically conductive parts.

Considering this prior art, the object of the present invention can viewed as being the provision of an illuminant that can be simply mounted and easily exchanged, said illuminant comprising a planar semiconductor lighting element for a lamp, wherein a simple design of the lamp having a total illumination surface comprising several illuminants is to be made possible.

SUMMARY

This object is achieved by an illuminant in accordance with patent Claim 1. The illuminant comprises a carrier element with a semiconductor lighting element. The carrier element may hold the semiconductor lighting element or, alternatively, may also be a component of the semiconductor lighting element. All planar semiconductor lighting elements can be considered for the semiconductor lighting element. The semiconductor lighting element is, in particular, an organic light-emitting diode (OLED) that is applied in multiple layers in a planar manner to a carrier surface of the carrier element. The carrier element has a plate-like or foil-like form. The length and width of said carrier element are greater than its thickness, preferably by a factor of at least 10. The carrier element may be composed of several layers and, for example, comprise two glass plates between which the semiconductor lighting element is arranged.

The plate-like or foil-like carrier element is arranged in an illuminant housing. The illuminant housing has a light exit opening through which the semiconductor lighting element can emit light. Preferably, the illuminant housing completely encloses the carrier element—apart from the light exit opening. The illuminant housing is electrically insulating. In this manner, protection against accidental contact is provided, so that the illuminant can be used for low-voltage lamps as well as for high-voltage lamps. In particular, the illuminant housing comprises a frame, said frame delimiting the light exit opening all the way around, and a housing rear wall.

An illuminant connection device is provided on the rear face of the illuminant housing on the housing rear wall. This illuminant connection device is disposed to establish a mechanical, as well as an electrical, connection with a socket. By arranging the connection device on the rear side of the illuminant opposite the front side, it can completely cover the socket once the connection has been established. Due to this, a particularly visually pleasing overall appearance of the lamp can be achieved. A simple option for the connection between the illuminant and the socket can be achieved, for example, in that the illuminant connection device comprises a detent means and/or a plug means. In so doing, the illuminant can preferably be snapped on or slipped on at a right angle with respect to the plane of its preferably planar illumination surface. Therefore, mounting and replacing the illuminant are particularly easy and can be accomplished, in particular, without tools.

Preferably, the rear face of the illuminant housing has a recess that is disposed for the at least partial accommodation of the socket. Consequently, once the connection is established, the socket extends into the recess of the illuminant housing. In particular, the illuminant connection device is arranged in the recess. In this manner, it is possible to improve the protection against accidental contact on the connection site between the illuminant and the socket and, additionally, achieve a flat design for a planar illuminant.

The illuminant connection device may have a design that is symmetrical relative to a point of symmetry or an axis of symmetry on the rear face of the illuminant housing. Considering such a design, it is possible to slip the illuminant onto the socket in several orientations.

In a preferred exemplary embodiment, the frame of the illuminant housing has an abutment surface against which abuts a light-emitting side of the carrier element, in particular in a planar manner. Both the abutment surface and the light-emitting side are configured, in particular, as planar surfaces. In this manner, the relative position between the illuminant housing and the carrier element is defined. Preferably, the abutment surface circumscribes the light exit opening. An undesirable tilting of the light-emitting side relative to the illuminant housing can be avoided. Such tilting could create visually unattractive mirror effects when the lamp is switched off, in particular if the illuminant comprises several illuminants on a common plane.

In order to achieve a particularly good alignment between the illuminant and the socket it is advantageous if the illuminant connection device comprises several detent means and/or plug means, said means being provided at a distance from each other on the rear side of the illuminant housing. As a result of this, several spaced apart connection points are created, these allowing a more accurate positional fixation of the illuminant on the socket. For example, the rear face of the illuminant housing may also have a surface that abuts against a counter-face of the socket once the connection is established.

Elastic bearing elements may be arranged in the illuminant housing between the carrier element and the cover, said elements pressing the light-emitting side of the carrier element against the abutment surface on the frame. In this manner, in can be ensured that the carrier element always takes the desired nominal position. In doing so, an adhesive connection with the carrier element is not necessary so that, if there is a defect, the carrier element can be easily exchanged.

For providing the electrical connection with the socket, the illuminant connection device is preferably accessible via the electrical illuminant connections that are provided on the rear face of the illuminant housing and may be provided in addition to the detent means and/or plug means. Consequently, the mechanical and electrical connection may be uncoupled. This can be advantageous if the illuminant must be connected with a socket mounted to a ceiling. Then the weight must not be carried by the electrical illuminant connections but will be taken by the additional mechanical connection means.

Semiconductor contact surfaces may be provided on the carrier element, said surfaces being electrically connected either to the anode or to the cathode of the semiconductor illuminant element. If more than one semiconductor illuminant element is provided on the carrier element, it is possible to provide correspondingly more than two semiconductor contact surfaces. Preferably, the semiconductor contact surfaces are located on the contact side of the carrier element opposite the light-emitting side. Therefore, the semiconductor illuminant elements can be electrically contacted by the contact side facing away from the light-emitting side in the illuminant. The semiconductor contact surfaces are arranged within the electrically insulating illuminant housing and are thus protected against accidental contact.

Each illuminant connection of the illuminant connection device is electrically connected to an illuminant contact. This electrical connection is provided within the illuminant housing. Each illuminant contact abuts against one of the semiconductor contact surfaces. To accomplish this, an electrically conductive illuminant contact part is preferably arranged in the illuminant housing, said illuminant contact part comprising the illuminant contact as well as the illuminant connection. The illuminant contact part can be made of a uniform material as a one-piece punched and/or bent part without joints or connecting points. Such an illuminant contact part can be manufactured in a simple and economical manner. Referring to a preferred exemplary embodiment, the illuminant contact part has a spring-elastic zone that represents one of the bearing elements. Via this spring-elastic zone, the carrier element is elastically biased against the abutment surface of the frame. In this embodiment, separate bearing elements are not needed.

The socket belonging to the illuminant comprises a socket housing that comprises a socket connection device on the connection side associated with the illuminant. The mechanical, as well as the electrical, connection with the illuminant can be established via the socket connection device. In doing so, the socket connection device and the illuminant connection device are preferably interacting. The mounting side of the socket housing on the side opposite the connection side is preferably disposed for fastening the socket housing to a mounting surface. Socket housing sides connect the connection side and the mounting side of the socket housing. On at least one socket housing side, there are provided supply connections for an electrical connection of the socket with a supply line. Preferably, such supply connections are provided on several socket housing sides so that the electrical wiring of a lamp with several sockets is simplified.

The supply connections of the socket are allocated to the positive terminal or to the negative terminal. Considering an advantageous embodiment, all the supply connections displaying the same polarity are electrically short-circuited with one another. Consequently, the series or parallel connection of several sockets of a lamp is simplified. Each socket housing side having supply connections is provided, for example, with each a supply connection displaying positive polarity and a supply connection displaying negative polarity. It is particularly preferred that each of the socket housing sides have supply connections displaying positive or negative polarity.

Preferably, the socket housing contains, in particular, two electrically conductive short-circuit connectors. Each short-circuit connector may be produced as a one-piece punched and/or bent part without joints or connecting points and consisting of a uniform material. Each short-circuit connector comprises several connection surfaces. Each of the supply connections that is short-circuited by the short-circuit connector is allocated one of the connection surfaces of a common short-circuit connector. The electrical wires of the supply line contact these abutment surfaces when the socket is connected to the supply line.

In a preferred exemplary embodiment, the socket connection device comprises electrical socket connections that are disposed for the electrical connection with the illuminant. In doing so, it is possible, in particular, for an additional mechanical connection to occur between the detent means and/or the plug means. The socket connections interact with the illuminant connections of an associate illuminant, for example.

Preferably, the socket connections displaying the same polarity are also electrically short-circuited with each other. In particular, this short-circuit connection is accomplished by one of the short-circuit connectors. In this way it is possible to provide several socket connections on the socket, said connections displaying the same polarity and having the same voltage applied to them. Each illuminant connection provided on the illuminant can thus be connected to one of the socket connections displaying the same polarity. In doing so, this also provides the option that the illuminant can be connected to the socket in various orientations or alignments.

Furthermore, it is of advantage if the short-circuit connector associated with the negative pole and the short-circuit connector connected with the positive pole have an identical form. In doing so, it is sufficient to only manufacture one form of short-circuit connector, thus reducing the costs of the socket. Each short-circuit connector may have a connecting section and contact surfaces at an angle relative to the connecting section. In the normal position of use, the short-circuit connectors may cross each other, thus being arranged separated from each other by an insulation distance. This isolation distance can be achieved if both short circuit members are preferably inserted in reverse position in the socket housing.

The lamp in accordance with the invention comprises an illuminant as well as a socket. Preferably, several sockets are arranged next to each other on a mounting surface, for example, in rows and/or columns. In doing so, the illuminants mounted to the sockets have a common total illumination surface. Preferably, the illuminant housing may have a rectangular contour so that several illuminants forming a common total illumination surface fit tightly against each other along a longitudinal side or a transverse side of the illuminant housing.

BRIEF DESCRIPTION OF THE DRAWINGS

Advantageous embodiments can be inferred from the dependent patent claims, as well as from the description. The description is restricted to essential features of the invention as well as to miscellaneous situations. The drawings are intended as a supplementary reference. They show in FIG. 1 a schematic representation, similar to a block circuit diagram, of a lamp comprising several illuminants and several sockets;

FIG. 3 a perspective representation of the illuminant as in FIG. 2, with a view of the rear side, as well as a perspective representation of an exemplary embodiment of a socket;

FIG. 4 the illuminant and the socket as in FIG. 3, with the connection established;

FIG. 5 a perspective representation of the illuminant and the socket as in FIG. 4, wherein the housing rear wall of the illuminant, as well as the mounting surface of the socket, have been removed in order to illustrate the electrical connection;

FIG. 6 a perspective, exploded, representation of the socket as in FIGS. 3 through 5;

FIG. 7 the socket as in FIG. 6, in partially mounted state;

FIG. 8 a plan view of the opened socket housing, viewed from the mounting side;

FIG. 9 a perspective view of the illuminant and the socket as in FIG. 3, looking obliquely at the front side of the illuminant and the connection side of the socket; and FIG. 10 a side view of the illuminant and the socket, with the connection established.

DETAILED DESCRIPTION

Figure 1:
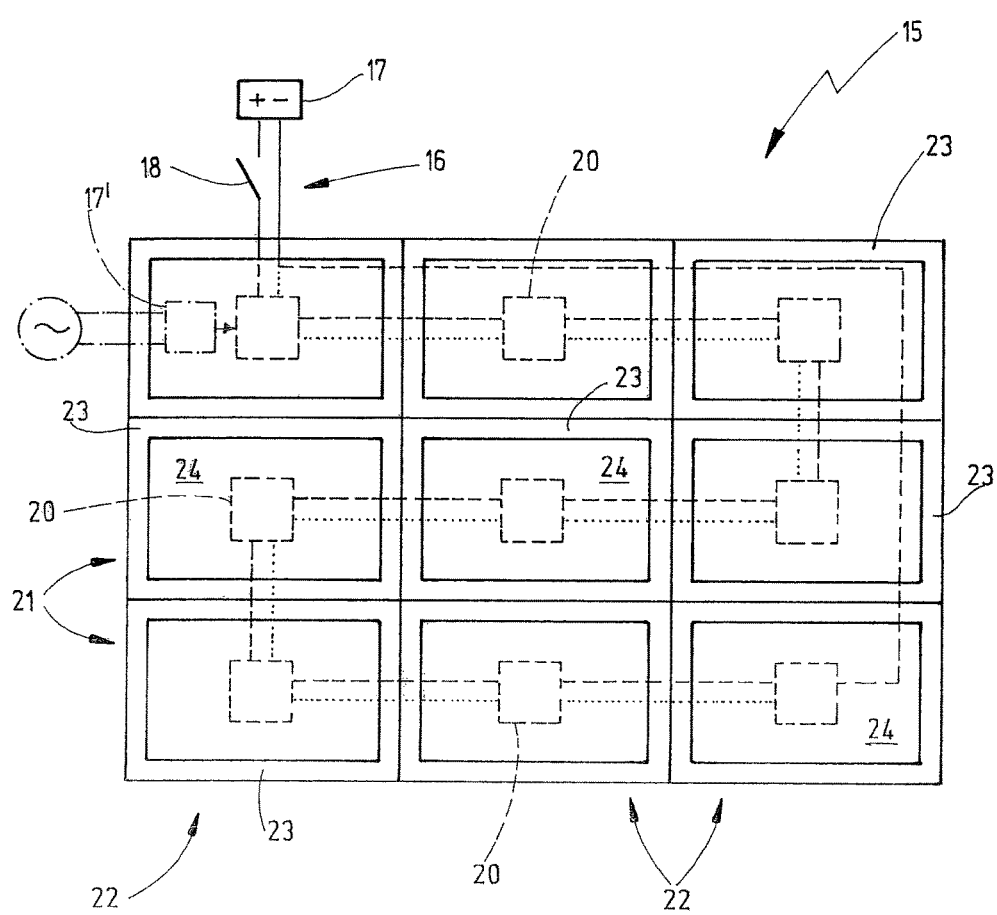

FIG. 1 shows a schematic diagram resembling a block circuit diagram of a lamp 15 that is connected to a voltage source 17 via a supply line 16. The voltage source 17 provides a DC voltage for supplying the lamp 15. The voltage source 17 may be a ballast device, for example. Only for symbolic purposes, a switch 18 exists in the supply line 16, said switch being disposed for switching the lamp 15 on and off. Instead of a voltage source 17, it is also conceivable to use a power source 17' as has been schematically indicated in chain lines. The power source 17' may be a component of a ballast device. The power source 17' may also be arranged as a power driver within the socket 20 and can be connected to the conventional voltage network. The sockets 20 are preferably connected in series to the power source 17'.

The lamp 15 comprises at least one socket 20. In the exemplary embodiment of FIG. 1, several sockets 20 are provided, said sockets being arranged in a matrix-like manner at regular distances from each other in several rows 21 or in several columns 22. Each socket 20 is mechanically, as well as electrically, connected to an illuminant 23. In the exemplary embodiment, the illuminants 23 have a rectangular design. The illumination surfaces 24 of the illuminants 23 form a common total illumination surface of the lamp 15. In doing so, they are preferably in abutment with each other along the longitudinal edges or the transverse edges. The distance of the sockets 20 from each other is fixed accordingly. For connecting an illuminant 23 with a socket 20, said illuminant is slipped or snapped—in slip-on direction at a right angle to its illumination surface 24—onto the associate socket 20, without the use of tools. In the opposite, slip-off, direction the illuminant 23 may also be pulled from the socket 20, preferably without the use of tools.

On the one hand, the invention relates to the design of the illuminant 23 and, independently thereof, to the design of the socket 20. In addition, the socket 20 and the illuminant 23 can be combined to form a lamp 15.

Figure 2:
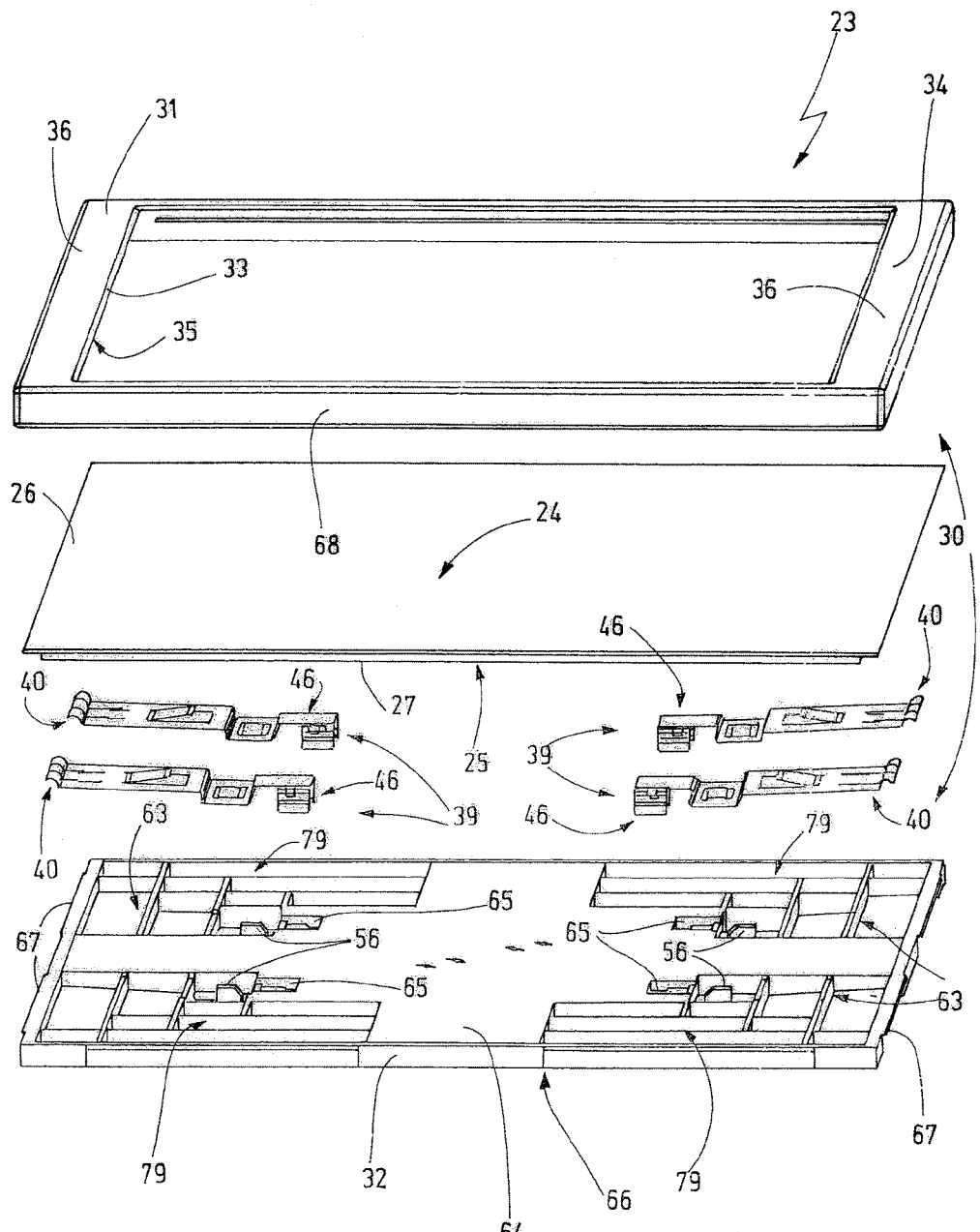
FIG. 2 a perspective, exploded, representation of an exemplary embodiment of an illuminant.

FIG. 2 is a perspective, exploded, representation of an exemplary embodiment of the illuminant 23. The illuminant 23 comprises a carrier element 25 that has the form of a plate or foil. The carrier element 25 comprises the semiconductor lighting element or is a component of the semiconductor lighting element. In the exemplary embodiment, the carrier element 25 is composed of several layers in a sandwich-like manner. In doing so, the semiconductor lighting element is arranged between a transparent front plate or foil 26 and a rear plate or foil 27. In the exemplary embodiment, the plates 26, 27 are glass plates. The front plate or foil 26 is larger than the rear plate or foil 27 and, in the exemplary embodiment, extends over the rear plate or foil 27 on two opposing sides. The front surface of the front plate or foil 26 facing away from the semiconductor lighting element is the illumination surface 24 of the illuminant 23. Electrical contact surfaces 28 are provided on the contact side of the front plate 26, said contact side facing away from the illumination surface 24. It is possible to provide one or more pairs of contact surfaces 28. In the exemplary embodiment, two pairs of contact surfaces 28 are provided on the two projections of the front plate 26. Therefore, the semiconductor lighting element can be contacted at various points in order to achieve a more uniform illumination appearance, even when large illumination surfaces 24 are intended. One contact surface 28 of a pair is connected to the anode and the other contact surface 28 of the same pair is connected to the cathode of the semiconductor lighting element. FIG. 5 shows the contact surfaces 28. In the exemplary embodiment, the contact surfaces 28 are arranged on two opposite sides of the semiconductor lighting element.

In a preferred exemplary embodiment, the illumination surface 24 is designed so as to be a planar surface. In the lamp 15 shown by FIG. 1, the planar illumination surfaces 24 of the illuminant elements 23 are located on a common plane. In this manner, it is possible to modularly assemble large total illumination surfaces of individual illumination surfaces 24 of the illuminants 23 on ceilings or walls.

Furthermore, the illuminant 23 comprises an illuminant housing 30 that consists of an electrically insulating material. In doing so, the term electrically insulating is to be understood here to mean that the DC voltages of up to 200 V and direct currents of up to 2 to 3 A usually applied to the lamps 15 are insulated from each other. The illuminant housing 30 consists of a frame 31 and a housing rear wall 32 between which the carrier element 25 is supported. The frame 31 has a light exit opening 33 that has a rectangular contour in the exemplary embodiment. The light of the illumination surface 24 is emitted through the light exit opening 33. Consequently, the illumination surface 24 represents the light-emitting side of the carrier element 25. The illuminant housing 30 preferably consists of a plastic material, for example, polycarbonate. This housing can be manufactured in an extremely simple and cost-effective manner by injection molding. Polycarbonate is amorphous and has minimal distortion.

Preferably, the illuminant housing 30 has a square or rectangular contour. In the preferred exemplary embodiment, it has a size of 150 by 150 millimeters. Side lengths corresponding to an integer divisor of 600 millimeters are preferred because ceilings in office or factory buildings frequently are divided into a grid of 600 by 600 millimeters. This results, for example, in building dimensions (length by width, or width by length) of 300 by 300 millimeters, 150 by 300 millimeters, 200 by 150 millimeters, 100 by 100 millimeters, 100 by 200 millimeters, etc.

The thickness or depth of the illuminant hosing 30 between the illumination surface 24 and a rear face 66 of the housing wall 32 decreases from a center region toward all the sides in outward direction. As a result of this tapering housing shape a particularly advantageous visually pleasing appearance is achieved. The flatness of the illuminant housing 30 is emphasized. At the same time, there is sufficient space for the accommodation of the socket 20 in the center region.

A circumscribing strip 34 encloses the light exit opening 33. On the side facing the illumination surface 24, the strip 34 has an abutment surface 35 against which abuts the outer edge of the light-emitting side of the carrier element 25. The abutment surface 35 is configured as a planar surface. In modification of the exemplary embodiment, the abutment surface 35 could also be only provided on the two strip sections 36 that are provided on opposite sides of the light exit opening 33. In particular, the strip sections 36 are provided at the location, where the contact surfaces 28 are arranged on the carrier element 25 or on the front plate 26 in order to ensure, at the same time, sufficient protection against accidental contact. Considering each and every embodiment of the abutment surface 35, said surface has to be configured in such a manner that a desired orientation of the illumination surface 24 relative to the illuminant housing 30 is established. Basically, this can already be accomplished with three spaced apart abutment points.

Figure 2A:
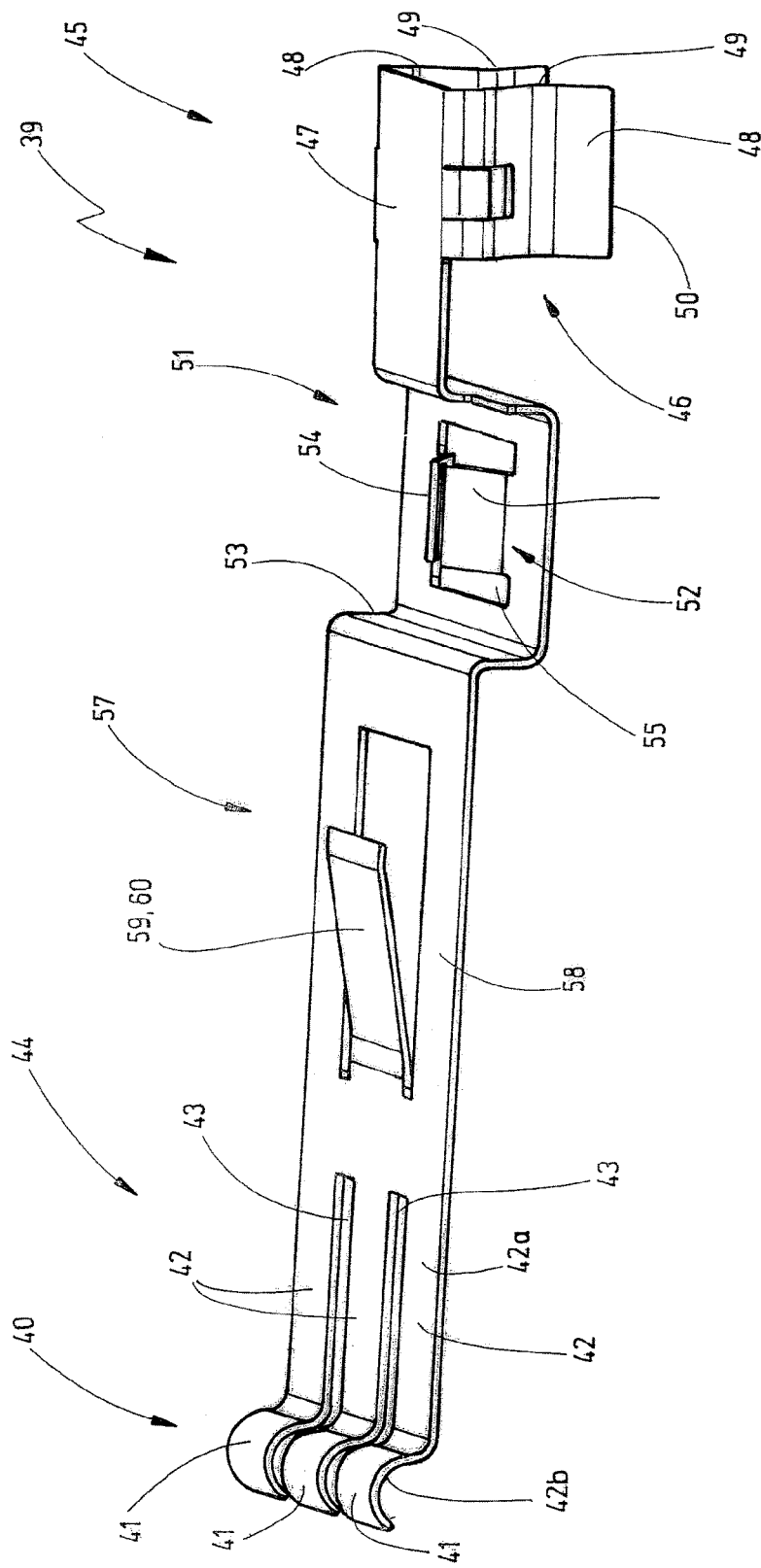
FIG. 2a a perspective representation of an illuminant contact part of the illuminant as in FIG. 2.

Illuminant contact parts 39 for electrically contacting the semiconductor lighting elements are provided between the housing rear wall 32 and the carrier element 25. FIG. 2a shows an enlarged representation of the illuminant contact part 39. The illuminant contact part 39 is made of a one-piece member and does not possess any joints or seams, and consists of a uniform material. Preferably, it is configured as a punched or bent part and is manufactured by being punched out of sheet metal and by being subsequently bent into the desired form.

The illuminant contact part 39 comprises an illuminant contact 40 with which the illuminant contact part 39 abuts against the associate contact surface 28 on the carrier element 25. The illuminant contact 40 may have several contact points 41 that abut against the illuminant contact 40 on the associate contact surface 28. Referring to the exemplary embodiment, several, and preferably three, contact tabs 42 are provided, each of said tabs having the same shape. Each contact tab 42 has a planar section 42a where the free end section 42b having the contact point 41 adjoins. The end section 42b is at an angle relative to the plane section 42a and has a curved profile. The contact tabs 42 can be moved toward each other and are separated from each other by slits 43. Consequently, in the normal position of use, a spring action of the contact tabs 42 is created so that the contact points 41 abut against the contact surface 28 with a specific spring bias.

In the preferred exemplary embodiment as in FIG. 2, the illuminant 23 has two contact surfaces 28 each for the anode and for the cathode. Accordingly, the illuminant 23 has four illuminant contact parts 39.

The illuminant contact 40 forms the first end 44 of the illuminant contact part 39. On the opposite, second, end 45, the illuminant contact part 39 has an illuminant connection 46 that is disposed for the electrical connection with the socket 20. The illuminant connection 46 is configured as a detent-plug connection. It comprises two contact wings 48 that are connected with each other via a crosspiece 47, said contact wings being identical in form. The contact wings 48 extend transversely from the crosspiece 47, in which case they first approach each other up to a bending point 49 and then, beginning at the bending point 49, extend away from each other toward their respectively free end 50. The two contact wings 48 are at the smallest distance from each other at the opposing bending points 49. The contact wings 48 extend away from the crosspiece in a direction opposite the bent ends 42b of the contact part 40. The crosspiece 47 is located on approximately the same plane as the planar section 42a of the contact tabs 42.

The first end 45 of the illuminant contact part 39 terminates in a holding section 51 where a holding clamp 52 is provided. In accordance with the example, the holding section 51 has an offset 53 within which the holding clamp 52 is located. The holding clamp is formed by two opposing clamping tabs 54 that are resiliently supported on opposite sides of a holding recess 25 on the holding section 51. The two reeds 54 extend obliquely toward each other above the retention opening 55 in the offset 53 so that their free ends are arranged next to each other in the offset 43. In the normal position of use, the illuminant contact part 39 is slipped onto a retention projection on the housing rear wall 32, said projection extending through the retention opening 55 and, in so doing, being affected in a clamping manner on both sides by the clamping tabs 54.

The illuminant contact part 39 has a spring-elastic zone 57 between the retention section 51 and the first end 44. The spring-elastic zone 57 has an elastically resilient spring tab 59 that is arranged on the tab holding part 58 of the spring-elastic zone 57. In particular, said spring tab is punched out of the tab holding part 58 and is angled at the edge of the punched out opening. The spring tab 59 extends obliquely away from the tab holding part 58. In the exemplary embodiment, the tab holding part 58 is in planar extension of the planar section 42a of the contact tabs 42. In the normal position of use, the spring tab 59 of the spring-elastic zone 57 acts as an elastic bearing element 60. One or more elastic bearing elements 60 are provided between the housing rear wall 32 and the carrier element 25 in order to press the carrier element 25 against the abutment surface 35 of the frame 31, so that said carrier element adopts the desired position. As is shown by FIG. 2, in this case there are four bearing elements 60. In the preferred exemplary embodiment, they are represented by the spring-elastic zone 57 and, in particular, by the spring tab 59. In the normal position of use, the spring tab 59 abuts against the carrier element 25 in a spring-biased manner.

In mounted condition, the illuminant contact parts 39 are respectively seated in a receiving region 63 on the side 64 of the housing rear wall 32 associated with the carrier element. Each receiving region 63 has an illuminant connection opening 65 for the illuminant connection 46, said opening completely extending through the housing rear wall 32. As a result of this, the illuminant connection 46 and the contact wings 48, respectively, are accessible from the rear face 66 of the housing rear wall 32.

In the established normal position of use of the illuminant 23, the frame 31 completely encloses the outside circumference of the housing rear wall 32. In doing so, preferably a detent connection is created between the frame 31 and the housing rear wall 32. To accomplish this, the exemplary embodiment has locking catches 67 on at least two opposing side edges, said locking catches coming into engagement with the indentations on the inside of the circumscribing frame side 68.

On the rear face 66 of the illuminant 23 or the illuminant housing 30, an illuminant connection device 70 is provided, said device being disposed for establishing the electrical, as well as the mechanical, connection with the socket 20. The illuminant connection device 70 comprises at least two and, in accordance with the example, four illuminant connections 46. Each of these illuminant connections 46 is connected in an electrically conductive manner with an illuminant contact 40 via the illuminant contact part 39 and thus provides the electrical connection to the respective anode or cathode of the semiconductor lighting element.

The illuminant connection device 70 further comprises detent means 71 that are exclusively disposed for establishing or aiding the mechanical connection between the illuminant 23 and the socket 20. In the described exemplary embodiment, the detent means 71 are represented by several detent projections 72. The detent projections 72 extend away from the rear face 66 of the illuminant housing 30. On their free ends, there is a lateral detent bulge 73. In snapped-on position, the detent projections 72 extend through a detent recess 74 on the socket, and the detent bulges 73 extend behind a respectively associated detent edge on the socket 20. In the exemplary embodiment, the detent projections 72 are arranged next to each other in pairs at a distance from each other. The detent bulges 73 extend in opposite direction away from the respectively adjacent detent projection 72.

The form and/or the size of the detent projections 72 and, in particular, of the detent bulges 73 may be selected in such a manner that sufficient retention of the detent connection is ensured and also the forces for establishing and/or separating the detent connection do not become too great. For example, the inclination and/or the size of an oblique surface 74a of the detent bulge 73 adjoining the free end of the detent projection 72 can be prespecified for adjusting the desired slip-on force when the detent connection is made.

Analogously, the inclination and/or the size of a detent abutment surface 74b with which the detent bulge 73 abuts against the associate detent edge of the socket 20 with the detent connection established can be prespecified for adjusting the desired pull-off force when separating the detent connection. The size and inclination of the surfaces 74a, 74b relates to the extension direction of the detent bulge 73 transverse to the slip-on and/or pull-off forces of the illuminant 23. The slip-on and/or pull-off forces are adapted to the stability of the illuminant 23 in order to not damage it when it is being slipped on and pulled off.

The illuminant connection device 70 is arranged in a recess 75 of the housing rear wall 32. The illuminant connections 46 and the detent projections 72 are arranged so as to be point-symmetrical with respect to a center M of the recess 75 or the rear face 66. The detent projections 72 are arranged so as to be aligned along a radial straight line through the center M on the housing rear wall 32. In the exemplary embodiment, the illuminant 23 can thus be rotated by 180 degrees and be connected to the socket 20 in both rotational positions.

Referring to a modified embodiment, a keying arrangement may be provided. The illuminant connection device 70 comprises a keying element 80 that interacts with a keying element of the socket 20 and allows the connection between the illuminant 23 and the socket only in the permissible relative positions. In this manner, electrically wrong connections between the socket 20 and the illuminant 23 can be prevented. It is also possible to provide several keying elements 80. Each keying element 80 is allocated a keying element of the socket 20. The keying element 80 and the associate complementary keying element can have any desired form. For example, the keying element 80 may also be a detent projection 72 or be arranged on the detent projection 72. In the exemplary embodiment, the detent projections 72 act as keying elements 80 that, based on their position, allow only the two above-described orientations of the illuminant 23 when the connection with the socket 20 is being established. Alternatively, the keying arrangements may also allow only one, or more than two, possible relative positions between the illuminant 23 and the socket 20 when the connection is being established.

In this case, the recess 75 has a rectangular and, in particular, a square contour. The recess 75 is centered in the housing rear wall 32. On all four sides, the recess 75 extends in respectively one supply channel 76. The channels 76 and the recess 75 have a common, preferably planar, bottom 77 that forms the rear face 66 of the housing rear wall 32 within the recess 75 and the supply channels. With the connection between the socket 20 and the illuminant 23 established, the supply channels 76 are disposed for accommodating the cable 78 of the supply line 16 connected with the socket 20 (FIG. 4). In the region of the supply channels 76 and the recess 75, the inside of the housing rear wall 32 is essentially planar. Next to this essentially planar region, the housing rear wall 32 has, in its respective corner region, an arrangement of stiffening ribs 79. A receiving region 63 for a respective illuminant contact part 39 is provided in a respective corner region with stiffening ribs 79. The stiffening ribs 79 have recesses for the accommodation of the illuminant contact part 39 in the receiving region 63.

In the exemplary embodiment, the illuminant 23 comprises only a few individual parts: the illuminant housing 30, the carrier element 25 with one or more semiconductor lighting elements, and two illuminant contact parts 39 for each existing semiconductor lighting element. The illuminant contact parts 39 are identical. Consequently, the illuminant 23 can be manufactured in a cost-effective manner. Several illuminants 23 can be grouped in a simple manner, wherein the illumination surfaces 24 can be easily oriented on one plane. Lamps 15 having a large total illumination surface can be composed. Because of the encapsulation of the electrical connections in the illuminant housing 30 the illuminant 23 is also suitable for higher DC voltages in the range of 200 V.

FIG. 6 is an exploded representation of a socket 20 in accordance with the invention. The socket 20 comprises a socket housing 90 that, in the exemplary embodiment, consists of two connectable housing shells 91. The socket housing 90 has four rectangular corners 92 where two adjacent socket housing sides 93 adjoin one another. On at least one, preferably several and, in the exemplary embodiment, all socket housing sides 93 there is a connection region 94 with at least one electrical supply connection 95.

The supply connection region 94 is represented by a connection recess 96 in the socket housing 90. In plan view of the socket housing 90, the connection recess has the shape of a trapeze and represents a notch in the respective socket housing side 93. Beginning at the side sections adjoining the corners 92, the connection recess 96 tapers inward through two opposing clamping sides 97 in downward direction. The clamping sides are connected with each other via a center side section 98. In this center side section 98, a connection opening 99 is provided for each supply connection 95. Referring to the exemplary embodiment, respectively one half of the connection opening 99 is provided on one of the two housing shells 91. In the exemplary embodiment, one or more projecting clamping strips 100 are provided on the clamping sides 97.

The socket 20 comprises several supply connections 95 displaying different polarities. One part of the supply connections 95 is allocated to the negative pole, and another part is allocated to the positive pole of the supply DC voltage. On each socket housing side 93 there is at least one supply connection 95 associated with the positive pole, as well as a supply connection 95 associated with the negative pole. Referring to the exemplary embodiment of the socket 20 described here, a supply connection 95 associated with the positive pole and a supply connection 95 associated with the negative pole is arranged in the supply connection region 94. With the connection with the illuminant 23 established, the supply connection region 94 is located at the point within the recess 75 where the supply channels 76 terminate in the recess 75. In doing so, the maximum width of the connection recess 96 corresponds approximately to the width of the supply channel 76.

Each supply connection region 94 is associated with a strain relief means 103 that can be detachably fastened to the socket housing 20, for example with the aid of a center screw 104. An internal thread 105 is provided on the socket housing 90 and is open toward the center side section 98. The strain relief means 103 is a clamping member 106 that has a contour adapted to the connection recess 96. In plan view, it also has a trapezoidal contour. On its inside associated with the center side section 98, said clamping member also has two flat insertion tabs 107 that can be inserted in associate insertion slits 108 on the socket housing 90. The insertion slits 108 are respectively located between the internal thread 105 and a connection opening 99.

On the sides associated with the clamping sides 97, the clamping member 106 has a clamping edge 109 that—with the clamping member 106 fastened to the socket housing 90—is located at a distance opposite the two clamping strips 100 of the associate clamping side 97. A cable 78 provided between the clamping edge 109 and the clamping strips 100 is clamped in place in a non-positive manner and is thus strain-relieved. As a result of the screwed connection 104, 105 the strain relief is able to absorb sufficient pulling forces on the cable 78. The number of clamping edges 109 and the clamping strips 100 for cable clamping may vary.

The mechanical connection between the two housing shells 91 can be established by a detent connection, in which case several detent hooks 110 are provided on one housing shell 91, said detent hooks being brought into detent connection with not specifically illustrated detent counter means on the other housing shell 91 when the two housing shells 91 are being snapped together.

The supply connections 95 are configured as electrical clamping connections. Each supply connection 95 comprises an electrically conductive connection surface 114. Each connection surface 114 is associated with a resilient connection clamp 115 the free end of which—in rest position—abuts against the connection surface 114 or is at least located at a minimal distance opposite said connection surface. The connection surface 114 is arranged parallel to an insertion direction E next to the insertion opening 99. On the opposite side of the insertion opening 99, the connection clamp 115 is connected in a resiliently pivotable manner. In its home position, the connection clamp 115 thus extends behind the associate connection opening 99 in a manner so as to be inclined relative to the connection surface 114. When a wire end of a cable 78 is inserted, the connection clamp 115 is pivoted away from the associate connection surface 114 by the wire end inserted in insertion direction E and pushes the not insulated wire end resiliently against the connection surface 114, so that a safe electrical contact is established between the wire of the cable 78 and the connection surface 114. In this manner, when a lamp 15 is mounted, a very simple cabling of the sockets 20 can be accomplished. Inasmuch as the socket 20 comprises supply connections 95 on several and, for example, on all socket housing sides 93, the supply line 16 can be connected from all sides to the socket 20.

In the socket housing 90, all supply connections 95 displaying the same polarity are short-circuited with each other and are thus on the same potential. As a result of this, a very simple series or parallel connection of several sockets 20 or associate illuminants 23 is made possible, because the socket housing 90 on one of the supply connections 95 can be selectively electrically connected to a supply connection 95 of another socket housing 90. Referring to the exemplary embodiment of the lamp 15 shown by FIG. 1, the sockets 20 are connected in series with each other (supply line 16 in solid and dashed lines). The supply line 16 is routed from the positive pole of the voltage source 17 in series through all the sockets 20 and, beginning with the last socket 20, is preferably routed directly back to the negative pole of the voltage source 17. This could be accomplished in an equally simple manner with a parallel connection of the sockets 20, as has been indicated as an alternative in dotted supply lines 16 in FIG. 1. Due to the fact that the sockets 20 have supply connections 95 from all sides, the effort required for wiring a lamp 15 with several sockets 20 is extremely minimal.

The sockets 20 can also be connected in groups to a respectively allocated voltage source 17 or power source 17' and can preferably be connected in series or also in parallel.

The short circuit of the supply connection 95 displaying the same polarity is achieved in that the connection surfaces 114 of the supply connections 95 displaying the same polarity are provided on a common short-circuit connector 116. The short-circuit connector 116 is configured as an electrically conductive component. In the exemplary embodiment, it is made of a uniform material in one piece without connecting and joining points and is configured, in particular, as a punched bent part. For example, the short-circuit connector 116 can be punched out of an electrically conductive sheet metal and be bent into the desired form, and can thus be manufactured in a cost-effective and simple manner. All the short-circuit connectors 116 are identical. Therefore, only one type and one single form of the short-circuit connector 116 needs to be manufactured for the socket 20.

In addition, the short-circuit connector 116 comprises one or more socket connections 117 that are disposed for the electrical connection with an associate illuminant 23. In the exemplary embodiment, two socket connections 117 are provided on each short-circuit connector 116, said socket connections thus being electrically short-circuited via the short-circuit connector 116. As a result of this, not only the supply connections 95 displaying the same polarity but also the socket connections 118 displaying the same polarity are electrically short-circuited—in accordance with the example—via a common short-circuit connector 116. In the exemplary embodiment, the socket 20 is disposed for connecting one illuminant with two semiconductor lighting elements, each having one anode and one cathode connection. Consequently, two socket connections 117 displaying positive polarity and two socket connections 117 displaying negative polarity are provided. The number of pairs of socket connections 117 having different polarities can thus depend on the number of semiconductor lighting elements present in the illuminant 23.

Each short-circuit connector 116 comprises a base section 118 extending essentially on one plane. This base section 118 may have several openings 119. Different positioning and connecting means provided in the socket housing 90 may extend through the openings 19, as is illustrated, for example, by FIG. 7.

A socket connection 117 is provided on each of the two opposite ends of the base section 118. The socket connection 117 comprises two oppositely arranged connection tabs 120 extending in transverse direction away from the base section 118. Beginning with the base section 118, the two connection tabs 120 initially extend away from each other up to a kink point 121 and, beginning at the kink point, again toward each other up to their respective free ends, wherein the free ends are a distance from each other. The two connection tabs 121 are identically configured. The socket connection is symmetrical with respect to a center plane. The respective center planes through the socket connections 117 of a short-circuit connector 116 extend at a distance in parallel direction. The center planes of the socket connections 117 are angled at approximately 45 degrees relative to a longitudinal center axis through the base section 118.

The connection surfaces 114 provided on the short-circuit connector 116 are provided on essentially planar connection parts 122. The connection surfaces 114 are inclined at an angle of approximately 45 degrees relative to the longitudinal center axis through the base section 118. Said connection surfaces extend either parallel to the center planes of the socket connections 117 or at a right angle thereto. The connection parts 122 having the connection surfaces 114 extend essentially at a right angle from the base section 118. The free ends of the connection tabs 120 and the free end edges of the connection parts 122 are arranged on the same side at a distance from the base section 118 and can preferably be located on about one plane. Apart from the socket connections 117, the short-circuit connector 116 is designed so as to be symmetrical to its longitudinal center plane.

Each connection surface 114 of a short-circuit connector 116 is assigned to another supply connection region 94. One of the short-circuit connectors 114 has the connection surfaces 114 of the supply connections 95 displaying positive polarity, whereas the other short-circuit connector 116 has the connection surfaces 114 of the supply connections 95 displaying negative polarity.

The supply connections 95 of directly adjacent supply connection regions 94, said supply connections displaying the same polarity, are arranged—viewed in circumferential direction—next to each other around the socket housing 90, i.e., beginning from a corner 92, a supply connection 95 displaying the same polarity follows on both socket housing sides 93. These two supply connections 95 are allocated a common clamping member 125 having end sections forming a connection clamp 115 for different supply connections 95. The two connection clamps 115 are connected to each other via a center piece 126. The connection clamps 115 extend in transverse direction away from the center piece 126, in which case their distance increases. The center piece 126 and the connection clamp 115 subtend an angle in the range of 100 to 110 degrees. In the exemplary embodiment, the transition between the connection clamp 115 and the center piece 126 is configured so as to be angled twice. An abutment part 127 is bent at a right angle on one longitudinal edge of the center piece 126, said abutment part being supported by the base surface of one of the two housing halves 91 in the normal position of use. In the transition region between the center piece 126 and the clamping element 115, the connecting clamp member 125 abuts against respectively one support projection 128 of the socket housing 90. The support projection 128 is arranged opposite the connection surface 114 next to the connection opening 99 in one of the two housing halves 91. The abutment part 127 is arranged between the two support projections 128.

In accordance with the example, two and a total of four connecting clamp members 125 are provided for the four supply connections 95 displaying positive polarity and the four supply connections displaying negative polarity.

In the normal position of use, the two short-circuit connectors 116 cross in the socket housing 90, wherein they extend relative to each other at an insulation distance A at the crossing point. At the crossing point, no insulating materials are provided between the two short-circuit connectors 116. The region between the two short-circuit connectors 116 at the crossing point is configured as a free space. In order to achieve the insulation distance A at the crossing point, one of the two short-circuit members 116 is arranged in back position and, for example, rotated—as in the example—by 90 degrees relative to the respectively other short-circuit member 116 in the socket housing 90. The free ends of the connection parts 122 and/or the connection tabs 120 of the one short-circuit member 116 are preferably located on a plane where the base section 118 of the respectively other short-circuit member 116 is located. At least the distance of the plane—where the free ends of the connection parts 122 and/or the connection tabs 120 of the one short-circuit member 116 are located—from the base section 118 of the other short-circuit member 116 is smaller than the distance between the two short-circuit members 116. The base section 118 of the one short-circuit connector abuts against the inside of one housing half 91, whereas the base section 118 of the respectively other short-circuit connector 116 abuts against the inside of the respectively other housing shell 91.

In other words: the base sections 118 of the two short-circuit connectors 116 are arranged, at an insulation distance A, on essentially parallel planes in the socket housing 90.

The socket 20 comprises a socket connection device 130 disposed for the mechanical and electrical connection of the socket with an associate illuminant 23. The socket connection device 130 comprises the socket connections 117 that are provided on the short-circuit connectors 116, in accordance with the example. Furthermore, the socket connection device 130 comprises mechanical connection means that ensure the mechanical connection with the illuminant 23 alone or together with the socket connections 117. The socket connection device 130 is provided on a connection side 131 of the socket housing 90 and can be accessed from this connection side 131. The mounting side 132 opposite the connection side 131 is disposed for mounting the socket housing to a mounting surface, for example the wall or ceiling of a room, or to any other surface.

In the exemplary embodiment described here, the mechanical connection means of the socket connection device 130 are formed by the detent edges 133 that are arranged in the socket housing 90 adjoining a socket housing opening 134. Resiliently supported holding elements 135 are molded to two opposing sides of the socket housing opening 134, said holding elements being hinged in an elastically pivotable manner adjoining the socket housing opening 134. On their respective free end, they support the detent edge 133 projecting toward the respectively opposite holding element 135. Detent projections 72 having detent bulges 73 can extend through the socket housing opening 134 into the socket housing 90 and extend around the detent edges 133 in order to establish the mechanical connection between the socket 20 and the illuminant 23.

Furthermore, socket connection openings 135 via which the socket connections 117 can be accessed are provided on the connection side 131 of the socket housing 90. In the exemplary embodiment, each socket connection 117 is allocated two socket connection openings 135 so that both connection tabs 120 of a socket connection 117 can be accessed via respectively one socket connection opening 135. The socket connection openings 135 have the form of slits for reasons of protection against accidental contact, so that touching the socket connection 117 with a finger becomes impossible.

Preferably, the electrical contact between the illuminant 23 and the socket 20 is ensured in that the illuminant connections 46 come into abutment with the socket connections 117. In the embodiments described here, the illuminant connections 46 extend around the socket connections 117. In doing so, the two connection tabs 120 of a socket connection 117 are located between the two contact wings 48 of the associate illuminant connection 46. In doing so, respectively one contact wing 48 is in abutment with one connection tab 120. Due to the spring-elastic support of the contact wings 48, as well as the contact tabs 120, a mechanical clamping force is also generated when the electrical contact between the illuminant 23 and the socket 20 is being established. Should this mechanical clamping force be sufficient, additional mechanical connection means between the illuminant 23 and the socket 20 can be omitted.

The socket connection device 130 is provided so as to be point-symmetrical with respect to a center P on the connection side 131. Both the socket housing openings 134 are provided on a radial straight line through the center P at equal distances from the center P in the connection side 131 of the socket housing 20. In doing so, the socket housing 20 can be rotated by 180 degrees about a rotational axis through the center P and be connected with the illuminant 23 in these two rotational positions.

The present invention relates to an illuminant 23 and a socket 20 for a lamp 15. The features of the socket 20 can also be implemented independently of the features of the illuminant 23. The illuminant 23 preferably has a planar illumination surface 24. One or more semiconductor lighting elements are arranged in an illuminant housing 30. The illuminant connection device 70 necessary for the mechanical and electrical connection with the socket 20 is provided on the rear face 66 of the illuminant 23 opposite the illumination surface 24. The dimensions of the illuminant 23 are preferably greater than those of the socket 20, so that the illuminant 23—viewed in the direction of the illumination surface 24—completely covers the socket 20. As a result of this, it is possible to achieve a particularly visually pleasing appearance. On several socket housing sides 93, the socket comprises a supply connection region, so that the electrical supply and wiring of the socket 20 can be accomplished selectively from different sides or also, at the same time, from several sides. Irrespective of the number and arrangement of the supply connection regions 94, several electrical supply connections 95 displaying the same polarity are provided on the socket 20. These supply connections 95 displaying the same polarity are electrically short-circuited. Respectively one short-circuit connector 116 is disposed for short-circuiting the supply connections displaying the same polarity, in which case in particular two identical short-circuit connectors 116 are arranged in the socket housing 90. A DC voltage is applied to the socket 20, which voltage can amount to approximately 200 V. With this socket 20 and the illuminant 23, it is possible to achieve, in a very simple modular manner, large total illumination surfaces of a lamp 15 featuring a visually pleasing overall appearance.

LIST OF REFERENCE SIGNS

15 Lamp
16 Supply line
17 Voltage source
18 Switch
20 Socket
21 Row
22 Column
23 Illuminant
24 Illumination surface of 23
25 Carrier element
26 Front plate or foil
27 Rear plate or foil
30 Illuminant housing
31 Frame
32 Housing rear wall
33 Light exit opening
24 Strip
35 Abutment surface
36 Strip section
39 Illuminant contact part
40 Illuminant contact
41 Contact point
42 Contact tab
42a Planar section of 42
42b Free end of 42
43 Slit
44 First end of 39
45 Second end of 39
46 Illuminant connection 47 Crosspiece
48 Contact wing
49 Bending point
51 Holding section of 39
52 Holding clamp
53 Offset
54 Clamping tab
55 Retention opening
56 Retention projection
57 Spring-elastic zone
58 Tab holding part
59 Spring tab
60 Bearing element
63 Receiving region
64 Inside of 32
65 Illuminant connection opening
66 Rear face
67 Locking catch
68 Frame side
70 Illuminant connection device
71 Detent means
72 Detent projection
73 Detent bulge
74a Oblique surface of 73
74b Detent abutment surface of 73
75 Recess
76 Supply channel
77 Floor
78 Cable of 16
79 Stiffening rib
80 Keying element
90 Socket housing
91 Housing shells
92 Corner of 90
93 Socket housing side
94 Supply connection region
95 Supply connection
96 Connection recess
97 Clamping sides
98 Center side section
99 Connection opening
100 Clamping strip
103 Strain relief means
104 Screw
105 Internal thread
106 Clamping member
107 Insertion tab
108 Insertion slit
109 Clamping edge
110 Detent hook
114 Connection surface
115 Connection clamp
116 Short-circuit connector
117 Socket connection
118 Base section
119 Opening
120 Connection tab
121 Kink point
122 Connection part
125 Connecting clamp member
126 Center piece
127 Abutment part
128 Support projection
130 Socket connection device
131 Connection side
132 Mounting side
133 Detent edge
134 Socket housing opening
135 Socket connection opening
E Insertion direction
M Center of 23
P Center of 20

The invention claimed is:

1. An illuminant for a lamp, the illuminant comprising:
a plate-like or foil-like carrier element comprising a semiconductor lighting element or being a component of a semiconductor lighting element;
an illuminant housing comprising a frame and a housing rear wall between which the carrier element is supported, the frame having, on a frame front side, a light exit opening for emitting light and, the housing rear wall defining a recess on a rear face of the illuminant housing;
an illuminant connection device located in the recess and configured to establish a mechanical and electrical connection with a socket, wherein the recess is sized to receive the socket and into which the socket can extend, wherein the illuminant connection device comprises:
at least two illuminant connections configured to make electrical contact between the carrier element and the socket through openings defined in the housing rear wall, and
one or more detents and/or plugs separate from the at least two illuminant connections and configured to provide mechanical connection between the illuminant and the socket,
wherein the illumination connection device and the socket are both arranged to be point-symmetrical with respect to a point of symmetry such that the socket can connect to the illumination connection device in both of two positions rotated 180 degrees from one another.

2. Illuminant as in claim 1, wherein a slip-on force and/or the pull-off force applied when establishing or separating a connection between the illuminant and the socket are configured to be prespecified by the form and/or size of a detent projection.

3. Illuminant as in claim 1, wherein the illuminant connection device comprises a keying device comprising at least one keying element configured to prespecify at least one permissible relative position of the illuminant relative to the socket when establishing a connection.

4. Illuminant as in claim 1, further comprising an abutment surface of the frame abutted against a light-emitting side of the carrier element.

5. Illuminant as in claim 4, further comprising elastic bearing elements disposed between the carrier element and the housing rear wall, the bearing elements pushing the carrier element against the abutment surface on the frame.

6. Illuminant as in claim 1, wherein semiconductor contact surfaces are provided on the carrier element, the semiconductor contact surfaces being electrically connected either with an anode or with a cathode of the semiconductor lighting element.

7. Illuminant as in claim 6, wherein the semiconductor contact surfaces are disposed upon a side opposite a light-emitting side of the carrier element.

8. Illuminant as in claim 6, wherein each of the at least two illuminant connections is electrically connected with an illuminant contact, the illuminant contact abutting against one of the semiconductor contact surfaces.

9. Illuminant as in claim 8, further comprising an electrically conductive illuminant contact part, the illuminant contact part comprising one of the illuminant connections and one of the illuminant contacts.

10. Illuminant as in claim 5, wherein the bearing elements are formed by spring-elastic zones of an illuminant contact part.

11. Illuminant as in claim 6, wherein the carrier element comprises two semiconductor lighting elements, each semiconductor lighting element having two semiconductor contact surfaces.

12. Lamp comprising:
- an illuminant comprising a plate-like or foil-like carrier element, the carrier element being a component of a semiconductor lighting element or comprising a semiconductor lighting element;
- an illuminant housing comprising a frame and a housing rear wall between which the carrier element is supported, the frame having on a frame front side, a light exit opening, and the housing rear wall defining a recess on a rear face of the illuminant housing which is sized to receive a socket;
- an illuminant connection device located in the recess and configured to establish a mechanical and electrical connection with the socket, wherein the recess is sized to receive the socket, wherein the illuminant connection device comprises:
  - at least two illuminant connections configured to make electrical contact between the carrier element and the socket through openings defined in the housing rear wall, and
  - one or more detents and/or plugs separate from the at least two illuminant connections and configured to provide mechanical connection between the illuminant and the socket;
- the socket which extends into the recess having, on a socket connection side associated with the rear side of the illuminant housing, a socket connection device comprising:
  - electrical supply connections disposed to receive outside power conducts, and
  - socket connections disposed to contact the at least two illuminant connections when the socket is disposed within the recess,
- wherein the illuminant connection device, together with the socket connection device, is disposed to establish a mechanical and electrical connection between the illuminant and the socket when the socket is disposed within the recess, and
- wherein the illumination connection device and the socket are both arranged to be point-symmetrical with respect to a point of symmetry such that the socket can connect to the illumination connection device in both of two positions rotated 180 degrees from one another.

13. Lamp as in claim 12, wherein the light exit opening delimits a planar illumination surface of the illuminant.

14. Lamp as in claim 13, wherein the illuminant, when viewed at a right angle in the direction of the illumination surface, completely covers the socket.

15. Lamp as in claim 12, further comprising a plurality of sockets.

16. Lamp as in claim 15, wherein the illumination surfaces of the illuminants arranged on the sockets are located on a common plane.

17. Illuminant as in claim 6, wherein each of a plurality of electrical illuminant connections is electrically connected with an illuminant contact, the illuminant contact abutting against one of the semiconductor contact surfaces.

18. Illuminant as in claim 8, wherein bearing elements are formed by spring-elastic zones of an illuminant contact part.

* * * * *